(12) United States Patent
Graichen

(10) Patent No.: US 8,096,030 B2
(45) Date of Patent: Jan. 17, 2012

(54) MOBILE REPAIR APPARATUS FOR REPAIRING A STATIONARY ROTOR SEAL OF A TURBO MACHINE

(75) Inventor: Andreas Graichen, Norrköping (SE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/738,130

(22) PCT Filed: Oct. 16, 2008

(86) PCT No.: PCT/EP2008/063955
§ 371 (c)(1),
(2), (4) Date: Jul. 26, 2010

(87) PCT Pub. No.: WO2009/050229
PCT Pub. Date: Apr. 23, 2009

(65) Prior Publication Data
US 2010/0287754 A1    Nov. 18, 2010

(30) Foreign Application Priority Data
Oct. 18, 2007   (EP) .................................... 07020384

(51) Int. Cl.
*B23C 1/00*     (2006.01)
*B23K 9/00*     (2006.01)
*B23P 6/00*     (2006.01)

(52) U.S. Cl. .................. 29/56.5; 29/DIG. 26; 29/889.1; 29/402.02; 29/402.03; 29/402.04; 29/402.05; 29/402.06; 29/402.07; 29/402.18; 29/402.19; 29/402.21; 29/407.04

(58) Field of Classification Search ................ 29/889.1, 29/402.02–402.07, 402.18, 402.19, 402.21, 29/407.04, 56.5, DIG. 26
See application file for complete search history.

(56) References Cited

U.S. PATENT DOCUMENTS

| | | | |
|---|---|---|---|
| 5,805,289 A * | 9/1998 | Corby et al. ................... | 356/613 |
| 7,223,935 B2 * | 5/2007 | Wessner ................... | 219/121.64 |
| 7,625,198 B2 * | 12/2009 | Lipson et al. ................. | 425/174 |
| 7,821,678 B2 * | 10/2010 | Tomita ........................... | 358/474 |
| 2004/0265120 A1 | 12/2004 | Tuffs et al. | |
| 2006/0042083 A1 | 3/2006 | Baker et al. | |
| 2006/0207094 A1 | 9/2006 | Allen et al. | |

FOREIGN PATENT DOCUMENTS

| | | |
|---|---|---|
| DE | 102004002551 A1 | 8/2005 |
| EP | 1312438 A1 | 5/2003 |
| EP | 1416063 A1 | 5/2004 |

* cited by examiner

*Primary Examiner* — Rick Chang
*Assistant Examiner* — Sarang Afzali

(57) ABSTRACT

A method and an apparatus for mobile repair of a stationary rotor seals of a turbo machine is provided. The method includes the following steps, 3D-scanning of the stationary seal, generation of 3D-model of the stationary seal, removing of the damaged spots of the seal using laser cutting, and generating a new seal at the repair spot by use of a second process head, which generates the seal by laser powder cladding. The apparatus includes a 3D-scanner, a cutting tool, and a first process head and a second process head.

11 Claims, 1 Drawing Sheet

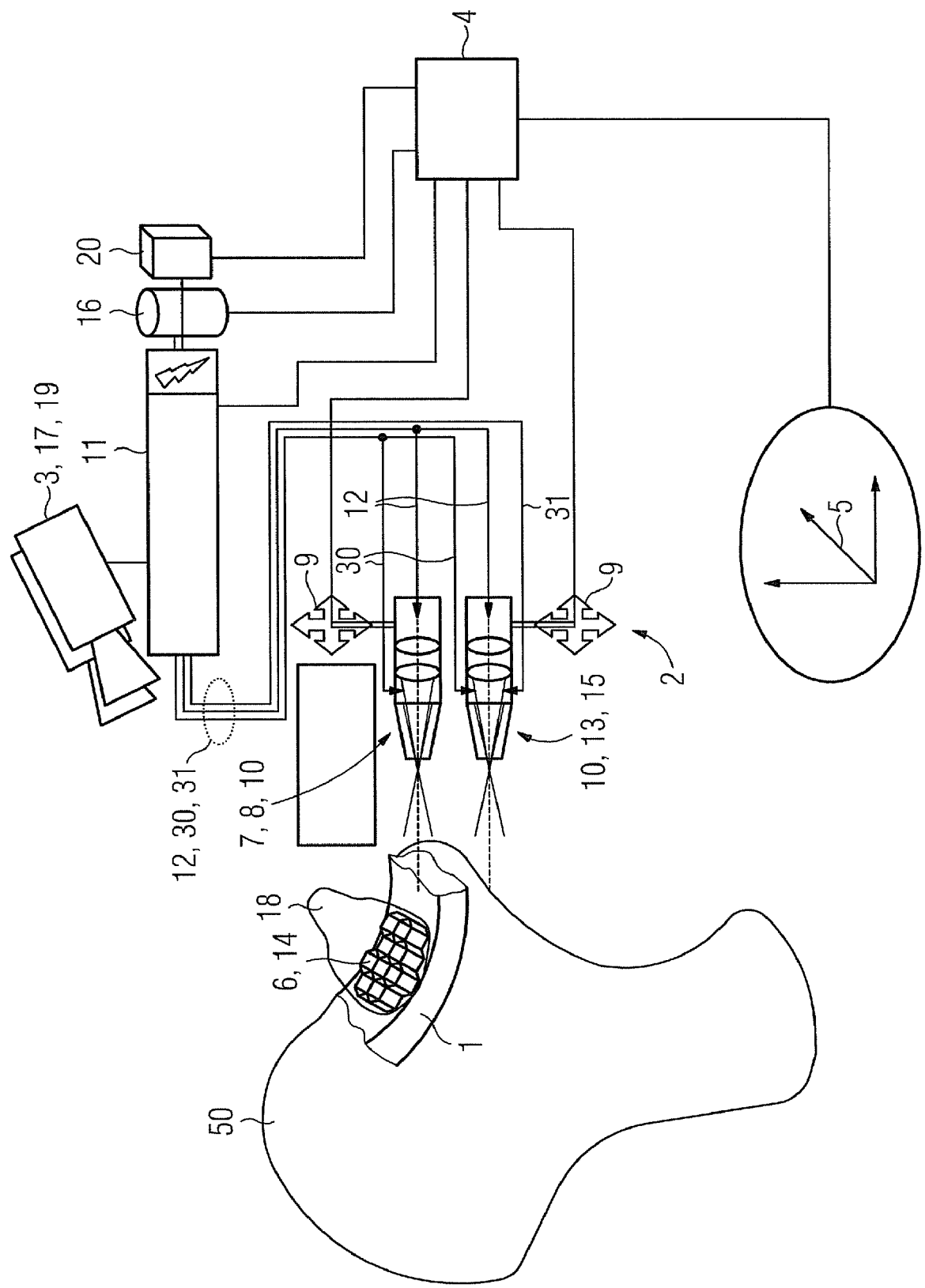

MOBILE REPAIR APPARATUS FOR REPAIRING A STATIONARY ROTOR SEAL OF A TURBO MACHINE

CROSS REFERENCE TO RELATED APPLICATIONS

This application is the US National Stage of International Application No. PCT/EP2008/063955, filed Oct. 16, 2008 and claims the benefit thereof. The International Application claims the benefits of European Patent Office application No. 07020384.9 EP filed Oct. 18, 2007. All of the applications are incorporated by reference herein in their entirety.

FIELD OF INVENTION

The present invention relates to a method to repair a stationary rotor seal of a turbo machine comprising the following steps, identification of damages of the seal, removing of the damaged spots of the seal with a cutting tool of a first process head of the repair apparatus at a repair spot, generating of a new seal at the repair spot by use of a second process head of the repair apparatus by powder cladding. Further the invention relates to an apparatus for carrying out the method.

BACKGROUND OF INVENTION

The turbo machine according to the invention can be of any type, for instance a steam turbine, a gas turbine or a turbo compressor. Basically the turbo machine consists of two main parts, a rotor and a casing, wherein the rotor and the casing have a rotor sealing in the area, where the rotor protrudes out of the casing. Due to the relative motion with the rotational speed of the rotor to the stator one major problem of any design is to seal off the necessary clearance between the rotor and the stator preferably with contact. Several approaches deal with the lowering of the leakage through this circumferential gap. In most cases a process medium is used to prevent leakage fluid exiting the casing. In any case, the sealing of the casing and the necessary sealing fluid supply diminishes the efficiency of the respective turbo machinery. Hence, steady effort is spend to reduce the amount of sealing fluid, which commonly results in the smallest radial gap between the rotor and the stator possible. Especially, in the field of gas turbines abradable seals are used so that the rotor machines its radial clearance during the first start itself. The second design approach which often is applied in conjunction with the abradable sealing makes use of a special geometry of at least one seal surface. Often circumferential seal strips are inserted in the rotor and the corresponding stator surface facing the seal strips has a special topological pattern, for instance a honeycomb shape also called honeycomb sealing. The honeycomb seals are permanently attached for example to the stator by welding and/or brazing methods due to reasons of mechanical integrity as well as different degrees of necessary heat resistance and thermal behavior. Often the stator component of the honeycomb seal is attached to a segmented ring also called segment.

During operation of a gas turbine or any other turbo machine, degradation of the honeycomb seal occurs and also unplanned damage can happen for example by foreign objects in the gas stream respectively steam flow. Also after several start-ups under differing starting conditions the honeycomb seals are partially worn away and the overall thermal efficiency decreases. Depending on the degree of efficiency loss it becomes economically feasible to repair the seals. Due to the complexity of honeycomb seals the replacement of these parts is usually expensive and the expected down time is also enlarged so that some turbo machines are operated with wasted seals since a repair would be less expensive than the operation with lowered efficiency. Especially in the context of low carbon dioxide emission these circumstances become unacceptable.

US 2004/265120 A1 and EP-A-1 416063 disclose a method of the incipiently mentioned type. US 2006/042083 discloses an apparatus according to the preamble of the claims.

SUMMARY OF INVENTION

It is one object of the invention to overcome the above-mentioned problems by providing a repair method and an apparatus for repairing of rotor seals for turbo machinery, which saves time and reduces the effort to put the seal into proper condition again.

The above object is solved according to the present invention by providing a method of the above mentioned type comprising the following steps,
identifying of damages of the seal,
removing of the damaged spots of the seal with a cutting tool of a first process head of the repair apparatus at a repair spot,
generating of a new seal at the repair spot by the use of a second process head of the repair apparatus by powder cladding.

Prefereably first the steps of opening of the casing of the turbo machine,
removing of a rotor of the turbo machine,
arranging of a repair apparatus at the stationary rotor seal,
3D-scanning of the stationary seal are performed.

The above object is also solved by a mobile repair apparatus, especially for application of the above method, for repairing a stationary rotor seal of a turbo machine, a cutting tool of a first process head for removing damaged spots of the seal at a repair spot, a second process head for generating a new seal at the repair spot by powder cladding, wherein the first process head comprises a laser device for cutting.

Preferably the apparatus also comprises a 3D-scanner for scanning the rotor seal.

The proposed method and the apparatus both enable to repair a stationary part of a rotor seal directly on side during a very short period of time. The mobility of the apparatus makes a very flexible operation possible.

The application of laser cutting tool increases the mobility of the apparatus since laser technology provides the possibility of very powerful cutting in combination with a light weight construction. Comparable machines lathing, boring or other machining are only possible with heavy duty machines to obtain the desired accuracy. Laser cutting is forceless and therefore even with a light-weight apparatus very accurate.

With similar advantages the powder cladding with the second process head is preferably performed with a laser device, which melts the powder exactly at the desired locations. Laser cutting and the laser powder cladding can be done very rapidly without high mechanical forces.

Preferably during the 3D-scanning of the stationary seal a 3D-model of the seal is generated, which enables the identification of damages of the seal and also forms the basis of the machining process.

One preferred embodiment provides only one laser light source for the cutting tool and the powder cladding. The single laser light source can be used in combination with two different process heads of which one is equipped with a suitable optic for cutting the damaged spots and the other is equipped with a suitable optic for laser powder cladding.

With advantage, the first process head and the second process head are both moved by a 3D-motion system respectively with reference to a mutual 3D-coordinate system. Also the 3D-model of the stationary seal advantageously refers to the same 3D-coordinate system.

The 3D-scanning of the seal is preferably done with a visible light scanner, which gives an accurate picture of the present condition. The visible light scanner can be arranged on a third process head, which is also moved with reference to the mutual 3D-coordinate system.

Preferably, the cutting and/or the cladding is done under an inert gas flow, respectively inert gas atmosphere, to avoid undesired reactions with the surrounding air.

One preferred embodiment of the invention provides one control unit, which controls the motion system and which is suitable to generate during the scanning process a 3D-model of the seal with reference to one common 3D-coordinate system. Such a common control and reference helps to avoid separate adjusting procedures between the steps of the method according to the invention.

The above-mentioned attributes and other features and advantageous of the invention and the manner of attaining them will become more apparent and the invention itself will be better understood by reference to the following description of the currently best mode of carrying out the invention taken in conjunction with the accompanying drawing, wherein:

BRIEF DESCRIPTION OF THE DRAWINGS

FIG. 1 shows a schematic depiction of a method and an apparatus to carry out the method according to the invention.

DETAILED DESCRIPTION OF INVENTION

FIG. 1 shows a schematic depiction of the different steps of a method for repairing a turbo machine seal 1 using an apparatus 2 according to the invention. During a first step according to the invention a turbo machine casing is opened and a rotor is removed, which is not depicted in FIG. 1. The seal 1 is part of the not further depicted casing and therefore the stationary part. After removal of the rotor the apparatus 2 is arranged in a position in the vicinity of the seal 1 suitable to carry out the method according to the invention.

In the following step a visible light scanner 3 assesses the current condition of the seal 1 and a 3D-model of the seal 1 is generated in a control unit 4 referring to a 3D-coordinate system 5. Based on the measurement respectively the 3D-model damages, respectively damaged spots 6 of the seal 1 are identified. A cutting tool 7 attached to a first process head 8 is moved by a motion system 9 spatially. By the application of a laser device 10 damaged spots 6 of the seal 1 are removed with the cutting tool 7. Laser light for the laser device 10 of the cutting tool 7 is provided by a laser light source 11, which laser light is conducted to the cutting tool 7 by means of light conductors 12.

After the removal of damaged spots 6 a second process head 13 also moved by the 3D-motion system 9 with respect to the 3D-coordinate system 5 and controlled by the control unit 4 generates the seal in the area, where of the damaged spots 6 where cut out, respectively at a repair spot 14. The second process head 13 generates the shape of the new seal 1 by laser powder cladding. The laser device 15 of the second process head 13 also uses the laser light source 11, which is connected to the second process head 13 also by means of light conductors 12.

The second process head 13, likewise the first process head 8, makes use of its own optic, which is suitable for powder laser cladding. The apparatus 2 comprises also an inert gas supply 16 to enable the processing, respectively the cutting and the cladding, to be performed under an inert atmosphere.

The scanner 3 is attached to a third process head 17, which moves are also controlled by the motions system 9 and the mutual control unit 4 and with reference to the 3D-coordinate system 5.

While the present invention has been described as having a preferred design, it can be further modified within the spirit and the scope of this disclosure. This application is therefore indented to cover any variations, uses and adoptions of the invention using its general principles. Further, this application is indented to cover such departures from the present disclosure as come with a known or customer practice in the art, to which this invention pertains.

The invention claimed is:

1. A mobile repair apparatus for repairing a stationary rotor seal of a turbo machine, comprising:
   a 3D-scanner configured to scan the stationary rotor seal;
   a cutting tool of a first process head configured to remove a plurality of damaged spots of the stationary rotor seal at a repair spot; and
   a second process head for configured to generate a new seal at the repair spot by powder cladding,
   wherein the first process head comprises a first laser device for cutting;
   wherein the first process head is configured to remove the plurality of damaged spots from a stationary casing of the turbo machine, said stationary casing comprising the stationary rotor seal; wherein the second process head is configured to generate the new seal at the stationary casing of the turbo machine; and wherein the first and second process head are positioned relative to the stationary rotor seal upon removal of a rotor from the turbo machine.

2. The apparatus as claimed in claim 1, wherein the 3D-scanner, the first process head and the second process head are moved by a 3D-motion system respectively with reference to a mutual 3D-coordinate system.

3. The apparatus as claimed in claim 2, wherein the 3D-scanner comprises a light source providing visible light for scanning.

4. The apparatus as claimed in claim 3, wherein the visible light is conducted to the cutting tool using a plurality of light conductors.

5. The apparatus as claimed in claim 1, wherein the 3D-scanner is arranged on a third process head which is moved with reference to the mutual 3D-coordinate system.

6. The apparatus as claimed in claim 2, wherein the apparatus further comprises a control unit which controls the 3D-motion system and which is suitable to generate a 3D-model of the stationary rotor seal with reference to the mutual 3D-coordinate system.

7. The apparatus as claimed in claim 1, wherein one mutual laser light source supplies laser light for the first process head and the second process head.

8. The apparatus as claimed in claim 7, wherein the first and second process head include a respective optic for the mutual laser light.

9. The apparatus as claimed in claim 8, wherein the second process head includes the respective optic such that the new seal is generated using powder laser cladding.

10. The apparatus as claimed in claim 1, wherein the second process head comprises a second laser device for powder cladding.

11. The apparatus as claimed in claim 1, wherein the apparatus further comprises an inert gas supply for the cutting and/or the powder cladding.

\* \* \* \* \*

UNITED STATES PATENT AND TRADEMARK OFFICE
CERTIFICATE OF CORRECTION

PATENT NO. : 8,096,030 B2  
APPLICATION NO. : 12/738130  
DATED : January 17, 2012  
INVENTOR(S) : Andreas Graichen It is certified that error appears in the above-identified patent and that said Letters Patent is hereby corrected as shown below:

Col. 4, line 40, remove [claim 1] and insert --claim 3--

Signed and Sealed this
Nineteenth Day of February, 2013

Teresa Stanek Rea
*Acting Director of the United States Patent and Trademark Office*